UNITED STATES PATENT OFFICE.

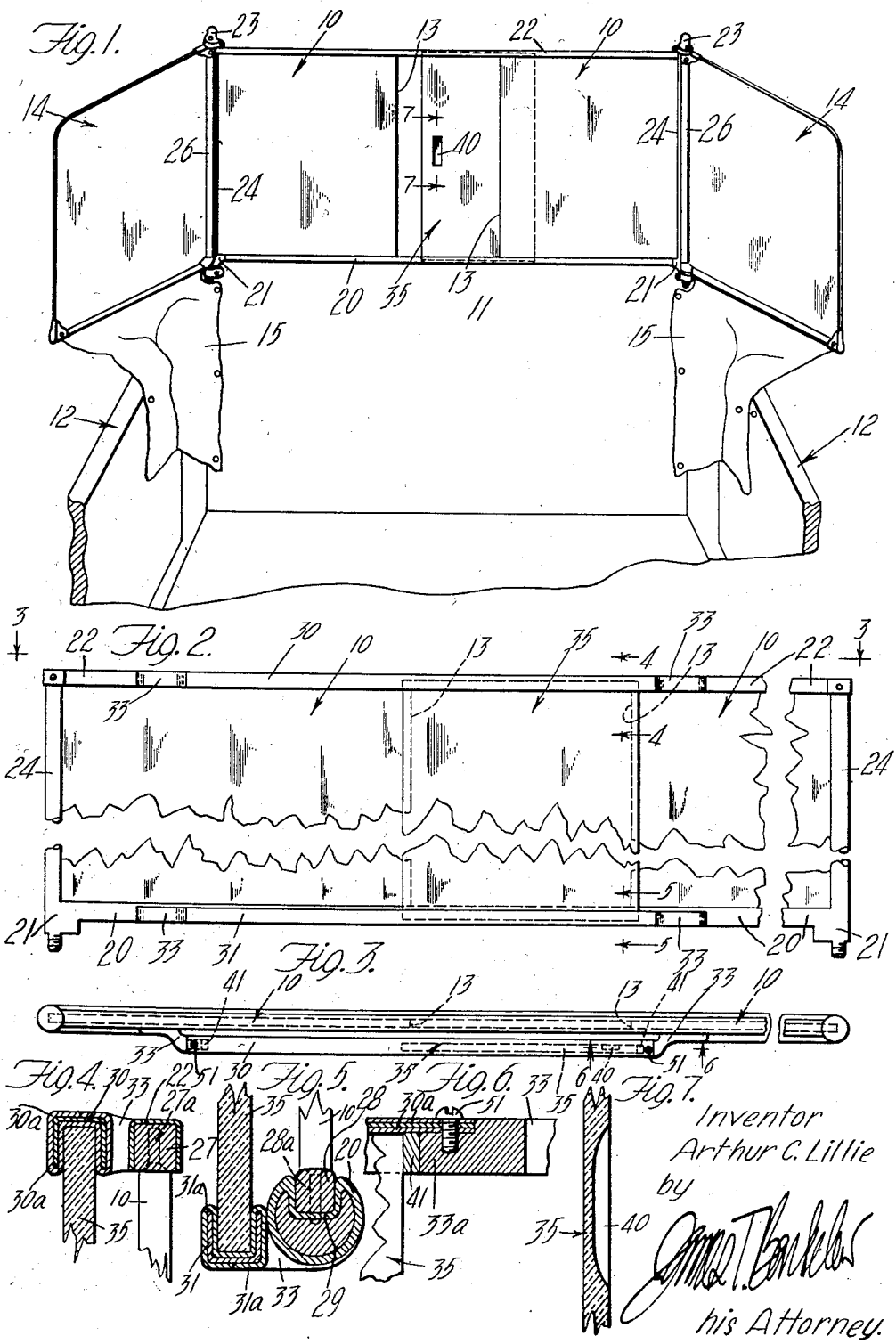

ARTHUR C. LILLIE, OF LOS ANGELES, CALIFORNIA.

WINDSHIELD.

1,412,476.

Specification of Letters Patent.

Patented Apr. 11, 1922.

Application filed January 29, 1920. Serial No. 354,831.

*To all whom it may concern:*

Be it known that I, ARTHUR C. LILLIE, a citizen of the United States, residing at Los Angeles, in the county of Los Angeles, State of California, have invented new and useful Improvements in Windshields, of which the following is a specification.

This invention relates to windshields and particularly to improvements in tonneau windshields, or windshields such as are used behind the forward seat or seats of automobiles. It is an object of the invention to provide a windshield of this character which may be manipulated, or set, to allow persons in the front seat or seats and persons in the rear seat or seats to converse.

Windshields commonly provided behind the forward seat or seats of an automobile, or tonneau windshields as they are commonly termed, comprise a continuous panel or a plurality of panels arranged to form a continuous panel. Such windshields although they are effective in protecting the occupants of the tonneau from wind are very inconvenient in many respects, particularly in that they make it difficult, in fact, practically impossible, for persons in the front seat of the machine to converse with persons in the tonneau thereof. Divided tonneau windshields or tonneau windshields of the character used in connection with divided front seats, as set forth in my co-pending application entitled Divided tonneau windshield, Serial No. 330,608, filed October 14, 1919, are provided with a hinged panel which may be swung to allow persons to pass from the front of the machine to the tonneau and vice-versa. These windshields, however, are particularly designed or adapted for use in connection with divided front seats and are designed to allow persons to pass between the seats. Being designed in this manner divided tonneau windshields present features which make it inconvenient for persons in the forward portion of the machine to converse with persons in the tonneau.

The present invention provides a tonneau windshield construction, particularly adapted for use in connection with a solid or integral front seat, which is simple, neat, sightly and particularly effective in allowing persons in the forward part of the machine to converse with persons in the tonneau thereof. In the practical embodiment of the invention the windshield comprises a plurality of panels one of which is slidable and is adapted to be easily manipulated or slid so as to uncover an opening in the windshield through which persons may converse.

There are further objects and features of the invention which are explained in, and which will be best understood from, the following detailed description of a preferred form of the invention throughout which reference is had to the accompanying drawings, in which—

Fig. 1 is a perspective view of the windshield provided by the invention showing it mounted on the back of the front seat of a typical automobile, and being a view taken from the rear of the machine looking forward; Fig. 2 is a front elevation of the windshield provided by the invention; Fig. 3 is a plan view of the windshield, being a view taken as indicated by line 3—3 on Fig. 2; Fig. 4 is an enlarged detail section taken as indicated by line 4—4 on Fig. 2; Fig. 5 is an enlarged detail section taken as indicated by line 5—5 on Fig. 2; Fig. 6 is an enlarged detail section taken as indicated by line 6—6 on Fig. 3; and Fig. 7 is an enlarged detail section as indicated by line 7—7 on Fig. 1.

Throughout the drawings numerals 10 designates two transparent stationary panels mounted on the top of the back 11 of the front seat of the automobile 12. The panels 10 are preferably vertical, arranged in the same plane, and spaced apart so that their adjacent edges 13 do not abut but are considerable distance apart. The panels 10 are preferably far enough apart to allow persons in the front part of the machine to conveniently converse with persons in the tonneau when the space is unrestricted. Transparent side panels 14 are connected to the panels 10, and are adjustable, or may be swung, about vertical axes at their inner edges. The inner edges of the side panels 14 are parallel with and close to the outer edges of the panels 10. The side panels 14 may be of any desired design or configuration and, in fact, as far as the present invention is concerned may be entirely dispensed with. In the form of construction shown in the drawings, curtains 15 are secured to the lower edges of the side panels 14 and are adapted to co-operate with the sides of the body 12, in the manner shown in Fig. 1, when the panels 14 are swung out.

The details of construction and mounting of the panels 10 and the side panels 14, may be and preferably are substantially as set forth in my co-pending application entitled Windshield, Serial No. 245,027, filed July 15, 1918, although it will be understood that any desired or suitable construction may be employed. In the particular form of construction shown in the drawings, the lower edges of the panels 10 are carried in a tubular frame member 20 which extends between brackets 21 mounted at the ends of the back 11, as clearly shown in Fig. 1. The tubular frame member 20 is of such configuration as to provide a channel or groove 29 into which the edges of the panels fit. The upper edges of the panels 10 are carried in a U-shaped channel 22 which extends between brackets 23 supported at the upper outer corners of the panels 10 on tubular framing 24 which extends vertically from the brackets 21 and carry the outer edges of the panels 10. The side panels 14 are provided at their inner and bottom edges with tubular framing 26 which pivotally connects to the brackets 21 and 23, as clearly shown in Fig. 1. It will be particularly noted that the tubular frame 26 supports both of the panels 10 and also that the channel 22 carries the upper edges of both of the panels 10. The panels 10 are spaced apart and are prevented from moving or shifting in the framing 20 and the channel 22 by a spreader 27 carried in the channel 22 between the edges 13 of the panels 10 and a spreader 28 carried in the channel 29 between the panels 10 or between the edges 13 thereof. The spreaders 27 and 28 may be held in place in any suitable manner; for instance, they may be secured by screws 27$^a$ and 28$^a$ respectively, as shown in the drawings. The construction above set forth provides a single frame structure for the two panels 10 and is particularly simple and effective.

Two guides 30 and 31, provided with felt coverings 30$^a$ and 31$^a$, respectively, are arranged parallel with and just forward of the channel 22 and tubular frame member 20, respectively. The guides 30 and 31 may be mounted on or attached to the channel and frame member in any suitable manner. For instance, brackets 33 having projections 33$^a$ which fit into the ends of the guides may be mounted on the channel 22 and frame 20, as shown in the drawings. Various means may be employed to connect or attach the brackets 33 to the channel 22 and the frame 20 but it is preferred that they be soldered or welded to these parts as such manner of connection is strong, neat and sightly. The guides may be secured to the brackets by suitable screws 51 which extend through the end portions of the guides and into the projections 33$^a$ of the brackets. The guides 30 and 31 are arranged to face each other, that is, the upper guide faces downwardly and the lower guide faces upwardly and a transparent panel 35 is carried in and between them. The panel 35 is independent of the stationary panels and can be moved or shifted independently of them. The various corners and edges of panel 35 are rounded or finished so that the panel will slide easily in the guides and so that it will not injure the hands of a person operating it or the felt which lines the guides. As will be noted in the drawings the panel 35 is sufficiently wide and the guides 30 and 31 are so arranged to make it possible to position the panel 35 so that it extends between, or covers the space between, the adjacent edges 13 of panels 10. It will be further noted that the guides 30 and 31 are sufficiently long to allow the panel 35 to be moved or slid to a position where the space between the adjacent edges of the panels 10 is open and unrestricted. It will be readily understood how this arrangement or construction provides a tonneau windshield which is particularly effective in shielding the tonneau against wind and which is capable of being easily manipulated or set so as to allow communication between the front portion of the machine and the tonneau portion thereof. Suitable resilient bumpers 41 are shellacked or otherwise attached to the ends of the projections 33$^a$ to stop the panel 35 when it has been moved to the ends of the guides. The bumpers 41 may be of any suitable material such as rubber, or the like. For convenience in operating or manipulating the panel 35 from the tonneau of the machine a hand grip 40 is formed in it in the manner shown in the drawings so that a person in the tonneau can easily grip the glass to move it.

The various transparent panels above referred to may be made of any suitable transparent material although it is preferred that they be glass as such material has many commercially desirable characteristics.

Having set forth a preferred embodiment of my invention I do not wish to limit or restrict myself to the specific details hereinabove set forth but wish to reserve to myself any changes or modifications that may appear to those skilled in the art or that may fall within the scope of the following claims.

Having described a preferred form of my invention, I claim:

1. In a tonneau windshield, two stationary panels spaced apart and arranged in the same vertical plane, and a movable panel arranged in a vertical plane spaced from the plane of the stationary panels, said panel being adapted to be moved horizontally to extend between the stationary panels.

2. In a tonneau windshield, two stationary panels spaced apart and arranged in the same vertical plane, vertically spaced horizontal guides at one side of the stationary panels, and parallel to their plane, and a movable panel mounted slidably in said guides and adapted to be moved parallel to the stationary panels to extend between them or to lie behind one of them.

3. In a tonneau windshield, two stationary panels spaced apart and arranged in the same vertical plane, vertically spaced horizontal guides at one side of the stationary panels, and parallel to their plane, a movable panel mounted slidably in said guides and adapted to be moved parallel to the stationary panels to extend between them or to lie behind one of them; and a rattle eliminating lining for the guides, said guides holding the movable panel spaced from the plane of the stationary panel.

In witness that I claim the foregoing I have hereunto subscribed my name this 19th day of January, 1920.

ARTHUR C. LILLIE.

Witness:
VIRGINIA BERINGER.